US009688161B2

(12) United States Patent
Zhang et al.

(10) Patent No.: US 9,688,161 B2
(45) Date of Patent: Jun. 27, 2017

(54) SLIP CONTROL DEVICE FOR ELECTRIC VEHICLE

(71) Applicant: NTN CORPORATION, Osaka (JP)

(72) Inventors: Yingjie Zhang, Iwata (JP); Koichi Okada, Iwata (JP); Naoyuki Uchiyama, Iwata (JP)

(73) Assignee: NTN CORPORATION, Osaka (JP)

( * ) Notice: Subject to any disclaimer, the term of this patent is extended or adjusted under 35 U.S.C. 154(b) by 6 days.

(21) Appl. No.: 14/978,511

(22) Filed: Dec. 22, 2015

(65) Prior Publication Data

US 2016/0107540 A1    Apr. 21, 2016

Related U.S. Application Data

(63) Continuation of application No. PCT/JP2014/067789, filed on Jul. 3, 2014.

(30) Foreign Application Priority Data

Jul. 8, 2013   (JP) .................................. 2013-142303
Mar. 20, 2014  (JP) .................................. 2014-057453

(51) Int. Cl.
*B60L 15/20*  (2006.01)
*B60K 28/16*  (2006.01)
(Continued)

(52) U.S. Cl.
CPC .............. *B60L 15/20* (2013.01); *B60K 28/16* (2013.01); *B60L 7/14* (2013.01); *B60L 7/18* (2013.01);
(Continued)

(58) Field of Classification Search
CPC ............ B60L 15/20; B60L 7/14; B60K 28/16
(Continued)

(56) References Cited

U.S. PATENT DOCUMENTS 4,860,847 A    8/1989  Shiraishi
7,377,349 B2   5/2008  Hommi et al.
(Continued)

FOREIGN PATENT DOCUMENTS

CN    101765531 A    6/2010
EP    1 541 406 A1   6/2005
(Continued)

OTHER PUBLICATIONS

Chinese Office Action dated Nov. 3, 2016 in corresponding Chinese Patent Application No. 201480038960.5.
(Continued)

*Primary Examiner* — Tan Q Nguyen (57) ABSTRACT

A slip control device for an electric vehicle which accurately determines slippage occurrence with only a rotation angle sensor for motor rotation control and perform rapid control to eliminate the slippage, is provided. A threshold calculation module (21) calculates a normal angular acceleration of a motor depending on a manipulation amount of an accelerator to obtain a threshold, and an angular acceleration calculator (22) differentiates a detection value from a rotation angle sensor (3a) twice to calculate an angular acceleration. A slip determination (23) determines whether a drive wheel (7) has slipped, and a torque limitation (25) limits a torque when a slippage has occurred. The determination (23) determines the angular acceleration and a threshold. The determination (23) counts a number of consecutive times it is determined that the threshold is exceeded, and determines that a slippage has occurred, if the number of consecutive times has reached a set value. The limitation (25) limits a torque developed by a motor unit for a drive wheel laterally opposite to the drive wheel determined as having slipped.

10 Claims, 8 Drawing Sheets

(51) Int. Cl.
    *B60L 7/14*    (2006.01)
    *B60L 7/18*    (2006.01)
    *B60W 10/08*   (2006.01)
(52) U.S. Cl.
    CPC ......... *B60L 15/2009* (2013.01); *B60W 10/08* (2013.01); *B60L 2220/12* (2013.01); *B60L 2220/14* (2013.01); *B60L 2220/44* (2013.01); *B60L 2220/46* (2013.01); *B60L 2240/421* (2013.01); *B60L 2240/423* (2013.01); *B60W 2510/082* (2013.01); *Y02T 10/645* (2013.01); *Y02T 10/7275* (2013.01)
(58) Field of Classification Search
    USPC .............................................. 701/22; 180/197
    See application file for complete search history.

(56) References Cited

U.S. PATENT DOCUMENTS

| | | | |
|---|---|---|---|
| 7,392,875 | B2 | 7/2008 | Matsuzaki |
| 8,392,090 | B2 | 3/2013 | Okamura et al. |
| 8,843,291 | B2 | 9/2014 | Ozaki |
| 8,849,538 | B2 | 9/2014 | Kato et al. |
| 9,067,507 | B2 | 6/2015 | Makino |
| 9,126,583 | B2 * | 9/2015 | Tsuchikawa ............. B60K 6/48 |
| 9,555,721 | B2 | 1/2017 | Zhang et al. |
| 2005/0150702 | A1 | 7/2005 | Matsuzaki |
| 2005/0284679 | A1 * | 12/2005 | Hommi .................. B60K 6/445 180/197 |
| 2007/0038340 | A1 | 2/2007 | Sekiguchi et al. |
| 2010/0191435 | A1 | 7/2010 | Okamura et al. |
| 2013/0345916 | A1 | 12/2013 | Ozaki |
| 2014/0046568 | A1 | 2/2014 | Kato et al. |
| 2014/0288752 | A1 | 9/2014 | Makino |
| 2014/0330470 | A1 * | 11/2014 | Ozaki .................... B60L 3/102 701/22 |
| 2014/0354034 | A1 | 12/2014 | Ozaki |
| 2016/0075256 | A1 | 3/2016 | Zhang et al. |

FOREIGN PATENT DOCUMENTS

| | | |
|---|---|---|
| EP | 2 700 532 A1 | 2/2014 |
| EP | 3 006 259 A1 | 4/2016 |
| JP | 63-259141 | 10/1988 |
| JP | 2-299402 | 12/1990 |
| JP | 8-182119 | 7/1996 |
| JP | 2005-186756 | 7/2005 |
| JP | 2006-50863 | 2/2006 |
| JP | 2007-49825 | 2/2007 |
| JP | 2011-105072 | 6/2011 |
| JP | 2012-121447 | 6/2012 |
| JP | 2012-186927 | 9/2012 |
| JP | 2013-106390 | 5/2013 |
| WO | WO 2012/144058 A1 | 10/2012 |
| WO | WO 2013/077409 A1 | 5/2013 |

OTHER PUBLICATIONS

PCT International Preliminary Report on Patentability dated Jan. 21, 2016 in corresponding International Patent Application No. PCT/JP2014/067789.

International Search Report mailed Sep. 16, 2014, in corresponding International Application No. PCT/JP2014/067789.

Extended European Search Report dated Apr. 4, 2017 in corresponding European Patent Application No. 14822755.6.

R. Pusca et al., "Fuzzy Logic Based Control for Electric Vehicle with Four Separate Traction Drives", Vehicular Technology Conference(VTC Spring 2002), IEEE, May 6, 2002, pp. 2089-2096.

* cited by examiner

SLIP CONTROL DEVICE FOR ELECTRIC VEHICLE

CROSS REFERENCE TO THE RELATED APPLICATION

This application is a continuation application, under 35 U.S.C. §111(a), of international application No. PCT/JP2014/067789, filed Jul. 3, 2014, which claims Convention priority to Japanese patent application No. 2013-142303, filed Jul. 8, 2013, and Japanese patent application No. 2014-057453, filed Mar. 20, 2014, the entire disclosures of which are herein incorporated by reference as a part of this application.

BACKGROUND OF THE INVENTION (Field of the Invention)

The present invention relates to a slip control device which is provided in an electric automobile such as a vehicle running by drive of only a motor or a vehicle including both a motor and an engine, and which performs torque control when a slippage occurs during running with the motor, to eliminate the slippage.

(Description of Related Art)

In order to prevent acceleration from being decreased due to a slip of a drive wheel caused by an excessive driving torque during acceleration for a vehicle, a traction control device for the vehicle is generally known to detect the slip amount of the drive wheel and limits engine output or a wheel braking force such that the slip amount of the drive wheel reaches a target slip amount for the frictional coefficient of a road surface (e.g., Patent Document 1). In particular, the traction control device controls the slip amount by decreasing the engine output or increasing the braking force.

Patent Document 2 proposes that, if a value of angular acceleration of a drive wheel exceeds an angular acceleration threshold, feedback correction is performed on a torque command by using a torque command correction value ΔTr including an item obtained by multiplying the angular acceleration by a feedback gain. Specifically, grip of the drive wheel on a road surface is detected by comparing the angular acceleration and the angular acceleration threshold. In addition, after the drive wheel returns from the slippery road surface to a normal road surface, a temporary decrease in the angular acceleration is detected by comparing the angular acceleration and another angular acceleration threshold. The values of the angular acceleration threshold and the feedback gain are set in accordance with an accelerator position and the wheel speed of the drive wheel. Moreover, a value of coefficient used in determining the angular acceleration threshold and the feedback gain is changed on the basis of whether a rotation frequency of a motor unit exceeds a base rotation frequency.

In addition to the above, an electric automobile which performs slip control and includes an in-wheel motor drive device including a wheel bearing unit, a motor unit, and a reducer unit, has been proposed, in which a disturbance observer is provided, which determines an estimate of an external force impact amount on a drive wheel (e.g., Patent Document 3). In this proposal, a correction value with respect to a slip amount of the drive wheel is determined by using the determined estimate of the external force impact amount, and an accelerating signal to the motor is corrected with the correction value to determine a motor torque command value.

RELATED DOCUMENT

Patent Document

[Patent Document 1] JP Laid-open Patent Publication No. S63-259141

[Patent Document 2] JP Laid-open Patent Publication No. H8-182119

[Patent Document 3] JP Laid-open Patent Publication No. 2012-186927

SUMMARY OF THE INVENTION

In the technique disclosed in Patent Document 1, the rotation speed of the drive wheel and the rotation speed of a driven wheel are required in order to calculate a slip amount. Thus, in a left/right-two-wheel drive electric automobile, in addition to a rotation angle sensor mounted on a motor unit, a rotation angle sensor is required for each driven wheel. Furthermore, the responsiveness of an engine and a brake is poor, so that rapid control can be impossible.

In the technique disclosed in Patent Document 2, the angular acceleration can be directly measured, but an acceleration sensor is expensive, so that the cost increases. In the case where the angular acceleration is indirectly obtained with a calculation on the basis of a rotation speed, the calculated angular acceleration is not accurate, so that the practicability decreases.

In the technique disclosed in Patent Document 3, in the case where an angular speed is indirectly obtained with a calculation, the accuracy would be poor, resulting in lack of practicality.

An object of the present invention is to provide a slip control device for an electric automobile which slip control device is able to accurately determine occurrence of a slippage by using only a rotation angle sensor for motor rotation control and perform rapid control to eliminate the slippage.

Hereinafter, for convenience of easy understanding of the present invention, a description will be given with reference to the reference numerals in embodiments.

A slip control device 20 according to one aspect of the present invention is provided in an electric automobile 5 including a plurality of traction electric motor units 3, for slip-controlling the electric automobile, the device including:

a threshold calculation module 21 configured to calculate a normal angular acceleration of a first motor unit 3 as a function of a manipulation amount of an accelerator 4 to calculate a threshold for slip determination, on the basis of the calculated normal angular acceleration;

an angular acceleration calculation module 22 configured to calculate an angular acceleration of the first motor unit 3 on the basis of a detection value from a rotation speed detection device 3a that detects a rotation speed of the motor unit 3;

a slip determination module 23 configured to determine whether a first drive wheel 7 driven by the motor unit 3 has slipped; and a torque limiting module 25 configured to limit a torque developed by the first motor unit 3, if the slip determination module 23 determines that the first wheel 7 has slipped. As such, the torque limiting module 25 limits the torque at the time of the slippage.

The slip determination module 23 includes:

an angular acceleration comparison section 26 configured to compare the angular acceleration calculated by the angular acceleration calculation module 22 to the threshold to determine whether the angular acceleration exceeds the threshold or is equal to or higher than the threshold;

a counting section 27 configured to count a number of times the angular acceleration comparison section 26 consecutively determines that the angular acceleration is equal to or higher than the threshold or exceeds the threshold; and a slip determination section 28 configured to determine that a slippage has occurred, if the number of times counted by the counting section 27 has reached a set value.

The torque limiting module 25 includes an opposite drive wheel torque limiting section 32 configured to limit a torque developed by the second motor unit that drives a second the drive wheel laterally opposite to the first drive wheel determined as having slipped as well as the torque developed by the first motor unit. For example, the opposite drive wheel torque limiting section 32 decreases the torque to 50% of a torque command value determined on the basis of an accelerator manipulation amount.

The value determined on the basis of the number of times counted by the counting section 27 may be the counted number of times as it is, or weighting may be performed on the counted number of times as described later and determination may be performed on the basis of a total.

Preferably, the rotation speed detection device includes a rotation angle sensor 3a that measures a rotation angle of the associated motor unit 3, and differentiates the rotation angle measured by the rotation angle sensor 3a, to detect the rotation speed.

According to this configuration, as a sensor, only the rotation angle sensor 3a configured to detect the rotation speed of the motor unit 3 is used, and the angular acceleration is obtained through calculation. Thus, a sensor other than the rotation angle sensor 3a for the drive wheel 7 is not required, and an expensive acceleration sensor is not required, so that cost increase is suppressed. Since the angular acceleration is obtained from the rotation angle sensor 3a, the detected angular acceleration may not be accurate enough. Nevertheless, if the number of consecutive times of being equal to or higher than the threshold, or a value determined on the basis of the number of consecutive times has reached the set value, it is determined that a slippage has occurred, so that the determination of slip occurrence can be determined errorlessly. In addition, since the torque of the motor unit 3 is controlled to eliminate a slippage, the responsiveness is good and rapid control is enabled, unlike the case of controlling an engine or a brake to eliminate a slippage.

Since the opposite drive wheel torque limiting section 32 of the torque limiting module 25 limits the torque developed by a second motor that drives a second drive wheel laterally opposite to the drive wheel determined as having slipped as well as the torque developed by the first motor unit, decreasing the straightness due to driving only a single wheel is prevented.

The torque limiting module 25 may include a torque zeroing section 29 configured to make the torque developed by the motor unit 3, to be zero if the slip determination module 23 determines that the slippage has occurred.

The torque of the motor unit 3 for the wheel 7 at which the slippage has occurred is made to be zero, whereby the occurring slippage is assuredly eliminated.

In the case of this configuration, the slip control device 20 may include a regenerative torque input section 33 configured to cause the motor unit 3 to generate a regenerative torque if a rotation speed of the drive wheel 7 is higher than a determined reference rotation speed after the torque developed by the motor unit 3 is made to be zero by the torque zeroing section 29.

If it is determined that a slippage has occurred, deceleration is positively made by causing the motor unit 3 to generate the regenerative torque, whereby the slippage can be eliminated more rapidly than when the motor torque is merely maintained at zero.

The slip determination section 28 may add, for each count, a weighted value depending on the count counted by the counting section 27, and may determine that the slippage has occurred, if a total of weighted values has reached a set score.

By performing appropriate weighting on the counted number of consecutive times, the slip determination can be performed further accurately.

In the case of including the torque zeroing section 29 or in the case of further including the regenerative torque input section 33, the torque limiting module 25 may include a torque recovery section 31 configured to: determine whether the rotation speed of the motor unit 3 has decreased to a slip determination reference rotation speed based on a rotation speed before it is determined that the slippage has occurred; and gradually increase and recover the torque developed by the motor unit 3, if determining that the rotation speed of the motor unit 3 has decreased to the slip determination reference rotation speed.

If the torque was rapidly restored after the torque of the motor unit 3 which drives the drive wheel at which the slippage has occurred is made to be zero, a feeling of acceleration would be provided to a person in the vehicle 5 such as a driver due to rapid acceleration of the vehicle 5. In contrast, when the torque recovery section 31 gradually increase the torque to recover the torque as described above, comfortable running performance can be maintained without providing a feeling of acceleration or deceleration to the person in the vehicle.

The torque limiting module 25 may include an opposite drive wheel slip determination section 37 configured to determine whether the second drive wheel laterally opposite to the first drive wheel determined as having slipped has slipped, and only if the opposite drive wheel slip determination section 37 determines that the second drive wheel has not slipped, the opposite drive wheel torque limiting section 32 may limit the torque developed by the second motor unit 3 that drives the second drive wheel.

In the case where the slip control device 20 is provided for each of the motor units 3 for the left and right drive wheels, if the laterally opposite drive wheel has slipped, control is performed by the slip control device 20 for the opposite drive wheel. Thus, only if the opposite drive wheel has not slipped, the opposite drive wheel torque limiting section 32 performs torque limitation, whereby interference of control by the slip control devices 20 for the left and right drive wheels is avoided.

In this case, the torque limiting module 25 may include: the torque zeroing section 29 configured to make the torque developed by the motor unit 3, to be zero if the slip determination module 23 determines that the slippage has occurred; the torque recovery section 31 configured to:

determine whether the rotation speed of the motor unit 3 has decreased to a slip determination reference rotation speed based on a rotation speed before it is determined that the slippage has occurred; and gradually recover the torque developed by the motor unit 3, if determining that the rotation speed of the motor unit 3 has decreased to the slip determination reference rotation speed; and an opposite drive wheel torque recovery section 38 configured to: determine whether the opposite wheel has slipped, in a step of the torque recovery by the torque recovery section 31; and recover a torque of the opposite drive wheel as well as the torque of the drive wheel determined as having slipped when torques of both of the left and right drive wheels become equal to each other, if determining that the opposite wheel has not slipped.

With this configuration, after the torque of the laterally opposite drive wheel is made to be zero, a slippage of the wheel that has slipped is eliminated, for example, due to moving out from a low μ road surface, it is confirmed, in the step of recovering the torque by the torque recovery section 31, that a slip has not occurred at the opposite drive wheel, and then the torque of the opposite drive wheel is also recovered. Thereafter, the torques of both of the left and right drive wheels can be recovered at equal paces, so that the straightness improves and operation feeling also improves. Accordingly, when the torque becomes equal to the torque of the opposite wheel (the wheel that has not slipped), the torques of both wheels are recovered, for example, by being increased to a torque command value based on the accelerator at equal paces. By so doing, the difference between the torques of both wheels cannot be completely eliminated, but the effect of independently driving the left and right wheels by in-wheel motor units can be exerted, and an uncomfortable feeling to the driver is alleviated to some extent.

An electric automobile according to one aspect of the present invention is the electric automobile including the slip control device 20. The slip determination module 23 and the torque limiting module 25 are provided for each of the motor units 3.

Each motor unit 3 may be a motor unit 3 forming an in-wheel motor device 11.

In the in-wheel motor device 11, each wheel 7 is individually driven by the motor unit, and thus is greatly affected by a slippage. Therefore, the effect by the slip control is more effectively exerted. In the in-wheel motor device 11, by providing the slip control device 20 to an inverter device 2 which controls the in-wheel motor device 11, a system including a slip control function with the in-wheel motor device 11 and the inverter device 2 can be configured independently of a main ECU (or VCU) 1 which performs integrated control and cooperative control of the vehicle. Thus, it is easy to configure a vehicle control system which exerts the slip control function.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Figure 1:
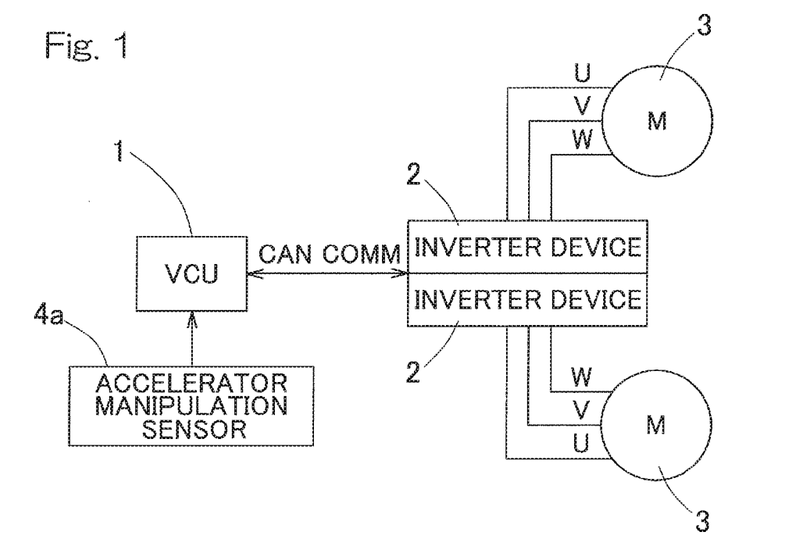
FIG. 1 is a block diagram of a schematic configuration of an electric automobile drive system including slip control devices, for an electric automobile, according to a first embodiment of the present invention.

A first embodiment of the present invention will be described with reference to FIGS. 1 to 4. FIG. 1 shows an electric automobile drive system including slip control devices according to the embodiment. The electric automobile drive system includes a VCU (vehicle control unit) 1 and inverter devices 2. The VCU 1 is a computer type vehicle control unit which performs integrated control and cooperative control of the entire vehicle, and is also referred to as "ECU" (electronic control unit). The inverter devices 2 are configured to apply driving currents to a plurality of traction motor units 3, respectively, in accordance with a drive command sent from the VCU 1. The VCU 1 and the inverter devices 2 are connected to each other so as to enable signal transmission therebetween via communication line such as CAN (control area network) communication. FIG. 1 shows an example of application to a vehicle including left and right two wheels which are driven by the motor units 3, respectively. In this example, each motor unit 3 includes an induction motor unit or a synchronous motor unit driven by three-phase alternating current. A drive command which indicates an accelerator manipulation amount and is outputted from an accelerator manipulation sensor 4a is inputted to the VCU 1, and distributed from the VCU 1 to the inverter devices 2 for the respective motor units 3.

Figure 2:
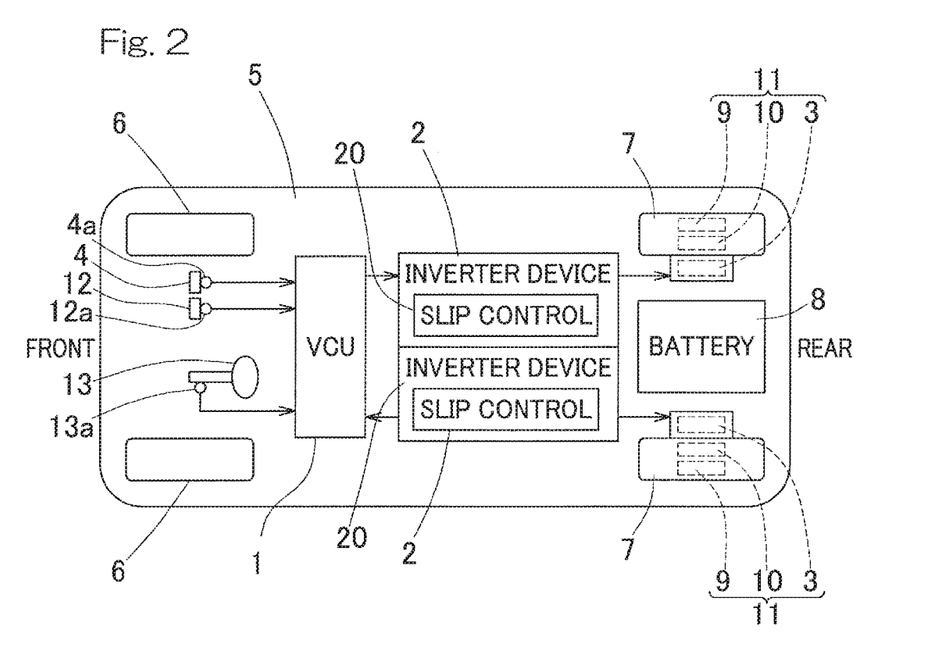
FIG. 2 is a block diagram showing an example of the electric automobile drive system shown in FIG. 1.

FIG. 2 shows an example of the electric automobile drive system. The electric automobile 5 includes a vehicle body and four wheels composed of front driven wheels 6 and rear drive wheels 7. The left and right rear wheels 7 function as drive wheels, which are driven by the motor units 3, respectively. In this example, each motor unit 3, together with a wheel bearing unit 9 and a reducer unit 10, forms an in-wheel motor drive device 11. The reducer unit 10 reduces the speed of rotation output from the motor unit 3 and transmits the rotation output to a rotating ring (not shown) of the wheel bearing 9.

The VCU 1 receives a signal indicating an accelerator manipulation amount, a signal indicating a brake manipulation amount, and a signal indicating a steering wheel manipulation amount, from the accelerator manipulation sensor 4a for an accelerator 4, a brake manipulation sensor 12a for a brake 12, and a steering sensor 13a for a steering wheel 13, respectively. In accordance with the signal indicating the accelerator manipulation amount from the accelerator manipulation sensor 4a, the VCU 1 generates torque command values to be distributed to the respective left and right motor units 3, in consideration of the signal indicating the brake manipulation amount and the signal indicating the steering wheel manipulation amount, and sends the torque command values to the respective inverter devices 2. Each inverter device 2 converts a DC power from a battery 8 into an AC motor driving current to control the motor driving current in accordance with the torque command.

The inverter devices 2 include slip control devices 20, for the electric automobile, according to the embodiment, respectively. Alternatively, the slip control devices 20 may be provided in the VCU 1.

Figure 3:
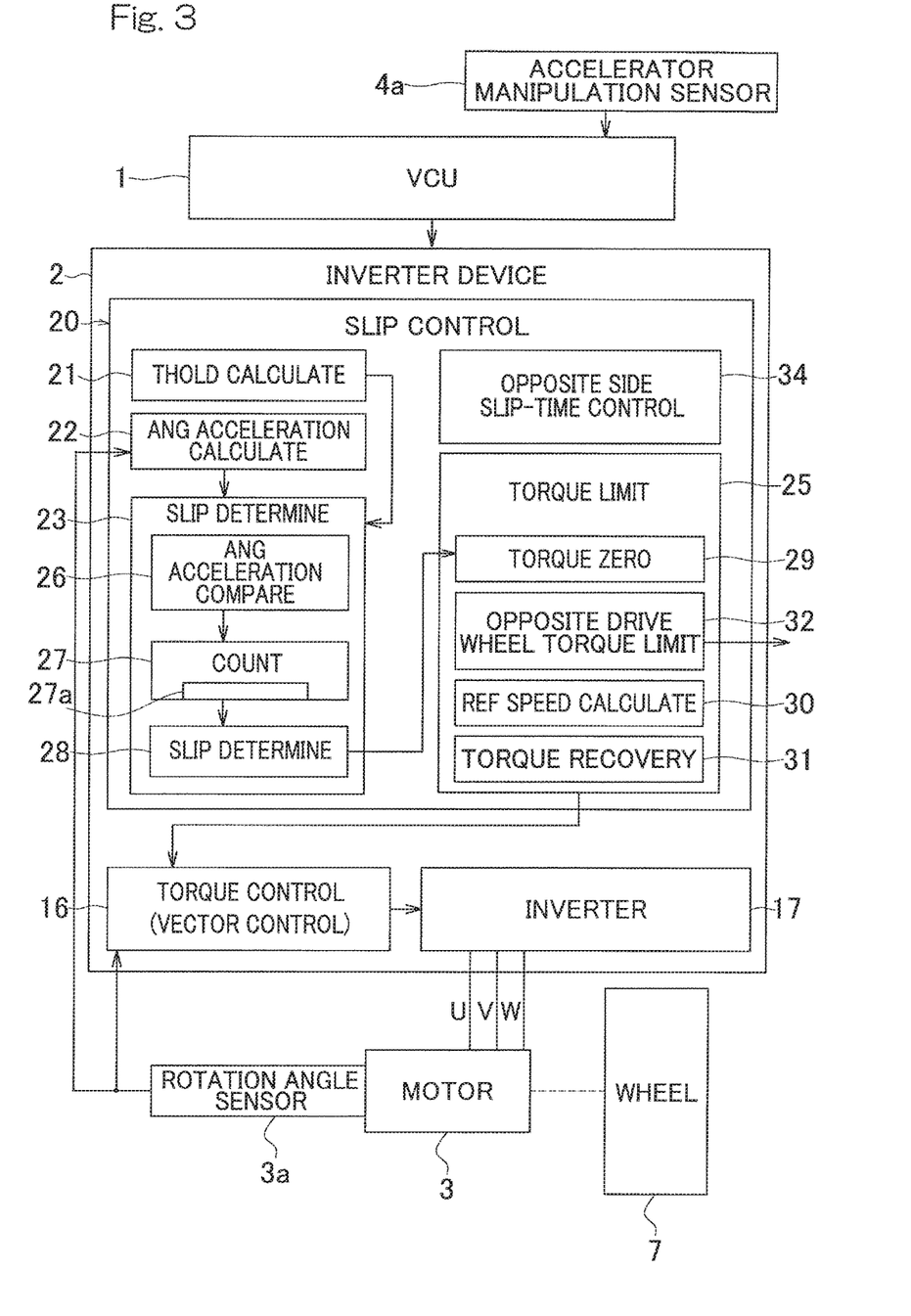
FIG. 3 is a block diagram of a schematic configuration of the slip control device of the electric automobile drive system shown in FIG. 1.

FIG. 3 is a functional block diagram showing the configuration of the inverter device 2, in particular, the configuration of the slip control device 20. The inverter device 2 includes: an inverter 17 which converts a DC power from a battery (not shown) into a three-phase AC power; and a torque control module 16 which converts the torque command sent from the VCU 1, into a current command and controls current output of the inverter 17. The torque control module 16 may perform control such as vector control which achieves efficiency improvement in accordance with a rotation angle of a rotor (not shown) of the motor unit 3. For this control, a rotation angle detection value of a rotation angle sensor 3a provided to the motor unit 3 is inputted to the torque control module 16.

The torque control module 16 is formed on a light current circuit segment including an electronic circuit of the inverter device 2 such as a microcomputer. The slip control device 20 is also formed on the light current circuit segment.

Figure 4:
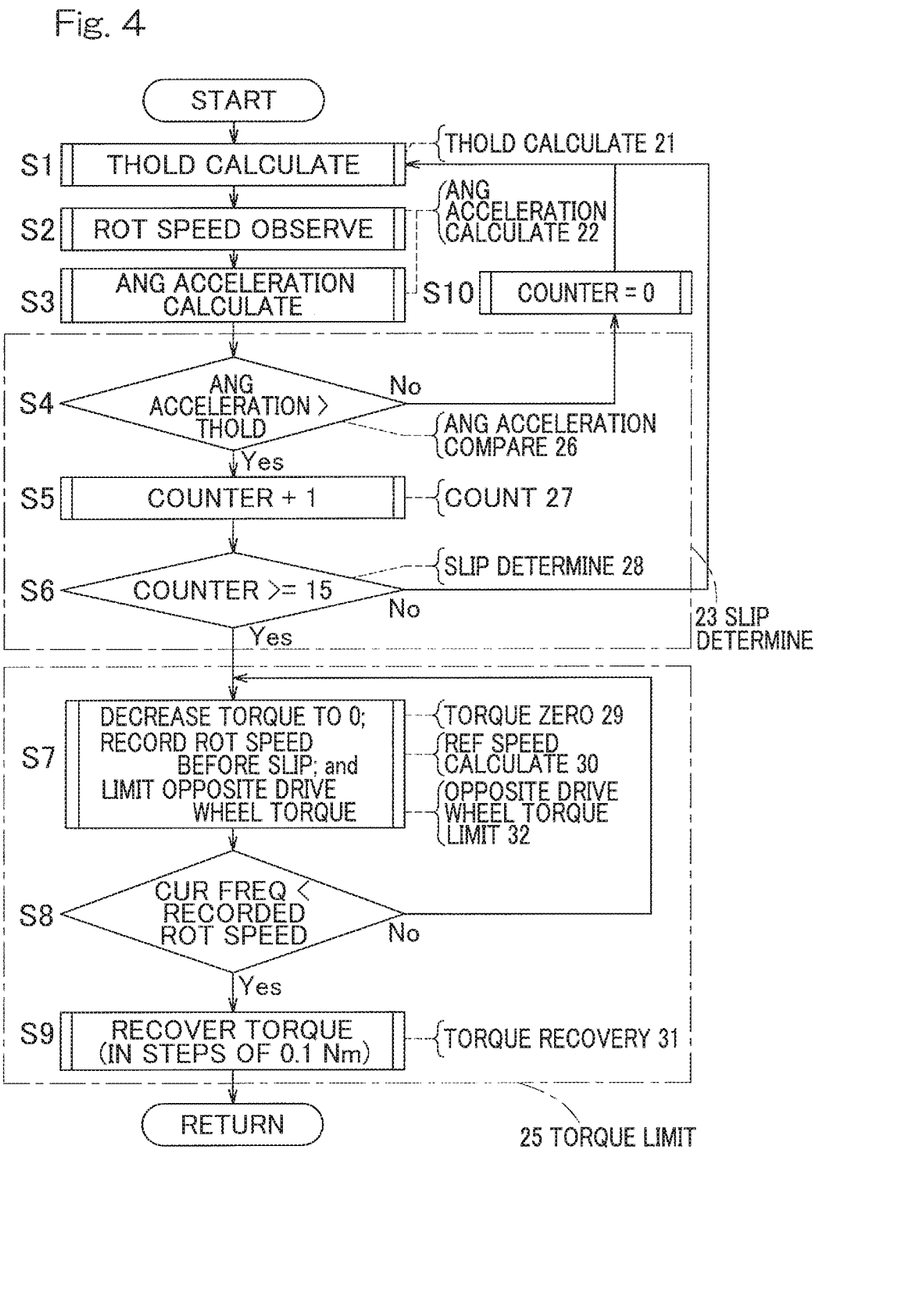
FIG. 4 is a flowchart showing a control operation of the slip control device shown in FIG. 1.

The slip control device 20 is configured to perform control shown in a flowchart of FIG. 4. As shown in FIG. 3, the slip control device 20 includes a threshold calculation module 21, an angular acceleration calculation module 22, a slip determination module 23, and a torque limiting module 25. The slip determination module 23 includes an angular acceleration comparison section 26, a counting section 27, and a slip determination section 28. The torque limiting module 25 is configured to limit the torque at the time of a slippage and includes a torque zeroing section 29, an opposite drive wheel torque limiting section 32, a reference speed calculation section 30, and a torque recovery section 31. The functions of the respective modules and sections will be described in detail with reference to the flowchart of FIG. 4. The slip control device 20 includes an opposite side slip-time control module 34 in addition to these modules.

FIG. 4 is a flowchart showing a control operation of the control device 20. The control operation will be described with reference to FIGS. 3 and 4. First, a threshold for slip determination is calculated (step S1). In the threshold calculation step (S1), a normal angular acceleration of the motor unit 3 as a function of a manipulation amount of the accelerator 4 outputted from the accelerator manipulation sensor 4a, that is, an angular acceleration which should be exhibited by the motor unit 3 in a normal situation in accordance with the manipulation amount of the accelerator 4, is calculated, and the calculated normal angular acceleration is set as the threshold. A value obtained by multiplying the calculated angular acceleration by an appropriately set coefficient or the like may be set as the threshold.

An example of the threshold will be described. An acceleration α which is given to the vehicle as a result of manipulation of the accelerator is calculated by the following formulas.

[Math. 1]

$$\alpha = \frac{T}{mr} \qquad \text{Formula 1}$$

The angular acceleration is:

$$\dot{\omega} = \frac{T}{mr^2} \qquad \text{Formula 2}$$

Where T denotes the sum of motor torques of all the motor units 3 (two in the illustrated example) included in the vehicle 5, m denotes the mass of the vehicle 5, and r denotes the radius of a tire of the drive wheel 7.

The sum T of the motor torques depends on the manipulation amount of the accelerator 4 (FIG. 2). Thus, an angular acceleration dω/dt (=·ω) is obtained from the above formulas 1 and 2 on the basis of the accelerator manipulation amount outputted from the accelerator manipulation sensor 4a. The obtained angular acceleration dω/dt is set as the threshold. That is, the angular acceleration dω/dt in the above formula 2 is an angular acceleration which should be exhibited by the motor unit 3 when no slippage has occurred.

The process in step S1 is performed by the threshold calculation module 21.

In a rotation speed observation step (S2), a rotation angle of the motor unit 3 is measured by the rotation angle sensor 3a. In an acceleration calculation step (S3), the measured rotation angle is differentiated twice to obtain an angular acceleration. The processes in steps S2 and S3 are performed by the angular acceleration calculation module 22.

Since only the rotation angle sensor 3a is used and an acceleration sensor which is expensive is not used, the cost can be reduced. However, the value obtained by performing differentiation twice as described above is varied greatly and cannot be used as it is. Thus, slip determination is performed by performing determination a plurality of consecutive times as described below.

In a determination step (S4) with respect to the threshold for angular acceleration, it is determined whether the angular acceleration calculated in step S3 exceeds the threshold obtained in step S1. It may be determined whether the angular acceleration is equal to or higher than the threshold. If the angular acceleration does not exceed the threshold, it is determined that no slippage has occurred, thus a counter 27a (FIG. 3) of the counting section 27 is reset to zero (S10), and the process is restarted from step S1. At this time of restart, a count value is zero. A return may be made from the step of counter reset (S10) in FIG. 4, and the process may be restarted from step S1.

If the angular acceleration exceeds the threshold in step S4, it is determined that there is a possibility that the angular acceleration has increased due to a slippage, and thus the counter 27a is incremented for the next slip determination (S5). The initial value of the counter 27a is zero.

It is determined whether the count value of the counter 27a has reached a set number of times N (the set number of times N=15 in the illustrated example). If the count value has not reached the set number of times, a return is made to step S1, and the process is restarted therefrom. At this time of restart, the counter 27a has not been reset, and thus the process is restarted with a count value at last time being maintained.

As described above, the determination as to whether the angular acceleration exceeds the threshold (S4) and the determination as to whether the count value has reached the set number of times (S6) if the angular acceleration exceeds the threshold are repeated. If the angular acceleration does not exceed the threshold, the counter 27a is reset (S10) as described above. Thus, in the determination as to whether the count value has reached the set number of times (S6), the number of times of consecutively exceeding the threshold is counted. If the count value has reached the set number of times N, it is determined that a slippage has occurred, and the process proceeds to step S7 for slip elimination.

As described above, if the angular acceleration has consecutively exceeded the threshold the set number of times N, it is determined that a slippage has occurred. Thus, even when occurrence of a slippage is determined on the basis of the angular acceleration obtained by differentiating twice the value from the rotation angle sensor 3a, occurrence of a slippage can be determined errorlessly.

The determination step (S4) with respect to the threshold for angular acceleration is performed by the angular acceleration comparison section 26. The counter addition step (S5) and the counter resetting step (S10) are performed by the counting section 27. The determination step (S6) as to whether the count value has reached the set number of times is performed by the slip determination section 28. The slip determination module 23 includes the angular acceleration comparison section 26, the counting section 27, and the slip determination section 28.

If it is determined that a slippage has occurred and the process proceeds to step S7, a command to make a torque developed by the motor unit 3 to be zero is sent to the torque control module 16 in order to eliminate the slippage. For the motor that drives the drive wheel 7 laterally opposite to the drive wheel 7 determined as having slipped, a command of limiting a torque developed by this motor unit 3 so as to make the torque to be zero, is also generated. The generated command of limiting the torque of the opposite drive wheel 7 is sent via the VCU 1 or directly to the inverter device 2 that drives the laterally opposite drive wheel 7. The process of making the torque to be zero in step S7 is performed by the torque zeroing section 29. In addition, generating the command of limiting the torque of the laterally opposite drive wheel 7 in step S7 is performed by the opposite drive wheel torque limiting section 32.

Since the torque of the motor unit for the drive wheel 7 at which the slippage has occurred is made to be zero, the occurring slippage is assuredly eliminated. Also, since the torque of the motor unit 3 is controlled to eliminate the slippage, the responsiveness is good and rapid control is enabled, unlike the case of controlling an engine or a brake to eliminate a slippage. In addition, for not only the drive wheel 7 at which the slip has occurred but also the drive wheel 7 laterally opposite to the drive wheel 7 at which the slip has occurred, the torque is made to be zero, and thus impairing the straightness of the vehicle 5 due to only one of the left and right wheels being driven is avoided.

The inverter device 2 that has received the torque limiting command from the opposite drive wheel torque limiting section 32 limits a torque according to the torque limiting command with the opposite side slip-time control module 34, in preference to the torque command distributed from the VCU 1, which depends on the accelerator manipulation amount.

In step S7, in addition to the above-described process of making the torque to be zero, as a reference rotation speed for torque recovery determination, the rotation speed at the time of angular acceleration comparison (S4) when the count counted until the set number of times N is 1 is recorded in a predetermined storage area. This rotation speed is referred to as "recorded rotation speed" in the following description. The rotation speed in the case of exceeding the threshold at the time of angular acceleration comparison (S4) is stored at all times, and in step S7, the rotation speed at the initial time of the consecutive N times is recorded in a predetermined storage area since this rotation speed is to be used as the reference rotation speed for torque recovery determination. The process in step S7 is performed by the reference speed calculation section 30. In the specification, "rotation frequency" and "rotation speed" are synonymous with each other.

After the torque is made to be zero as described above, the current rotation speed of the wheel 7 obtained on the basis of a detection value from the rotation angle sensor 3a is compared to the recorded rotation speed (S8). If the current rotation speed is higher than the recorded rotation speed, it is determined that the slippage has not been eliminated yet, that is, it is determined that the wheel 7 has not gripped. If it is determined that the slippage has not been eliminated yet, a return is made to the process in step S7, and the torque is maintained at zero.

If, as a result of the comparison in step S8, the current rotation speed is equal to or lower than the recorded rotation speed, it is determined that there has been a recovery from the slippage, that is, the wheel 7 has gripped. In other words, if the current rotation speed has decreased to a rotation speed that is the rotation speed prior to the slippage, it is determined that the wheel 7 has gripped.

If it is determined that the wheel 7 has gripped, the torque is gradually increased to be recovered. Specifically, the torque is increased by a slight set amount (e.g., 0.1 Nm) every set period of time to be recovered (S9). The torque command value distributed to the motor unit 3 depending on the accelerator manipulation amount is defined as a maximum value of the torque. The process in step S9 is performed by the torque recovery module 31. After the torque is recovered in this manner, a return is made.

Also for the motor unit 3 for the opposite drive wheel 7, the torque recovery section 31 sends, to the opposite inverter device 2, a command of gradually increasing the torque to recover the torque similarly as in the above. The opposite side slip-time control module 34 of the opposite inverter device 2 increases the torque to recover the torque in accordance with the received torque recovery command.

If the torque was rapidly restored after the torque of the motor unit 3 at which the slippage has occurred is made to be zero, a feeling of acceleration or an acceleration sensation would be provided to a person in the vehicle such as a driver due to rapid acceleration of the vehicle. In contrast, when the torque recovery section 31 gradually increases and recovers the torque as described above, comfortable running performance can be maintained without providing a feeling of acceleration or deceleration to the person in the vehicle.

The torque limiting module 25 includes the torque zeroing section 29, the opposite drive wheel torque limiting section 32, the reference speed calculation section 30 and the torque recovery section 31.

In the above-described embodiment, the count value of the counter 27a and the set number of times N are compared to each other in step S6 of slip determination. Alternatively, a slippage may be determined by using a weighted count value.

Figure 5:
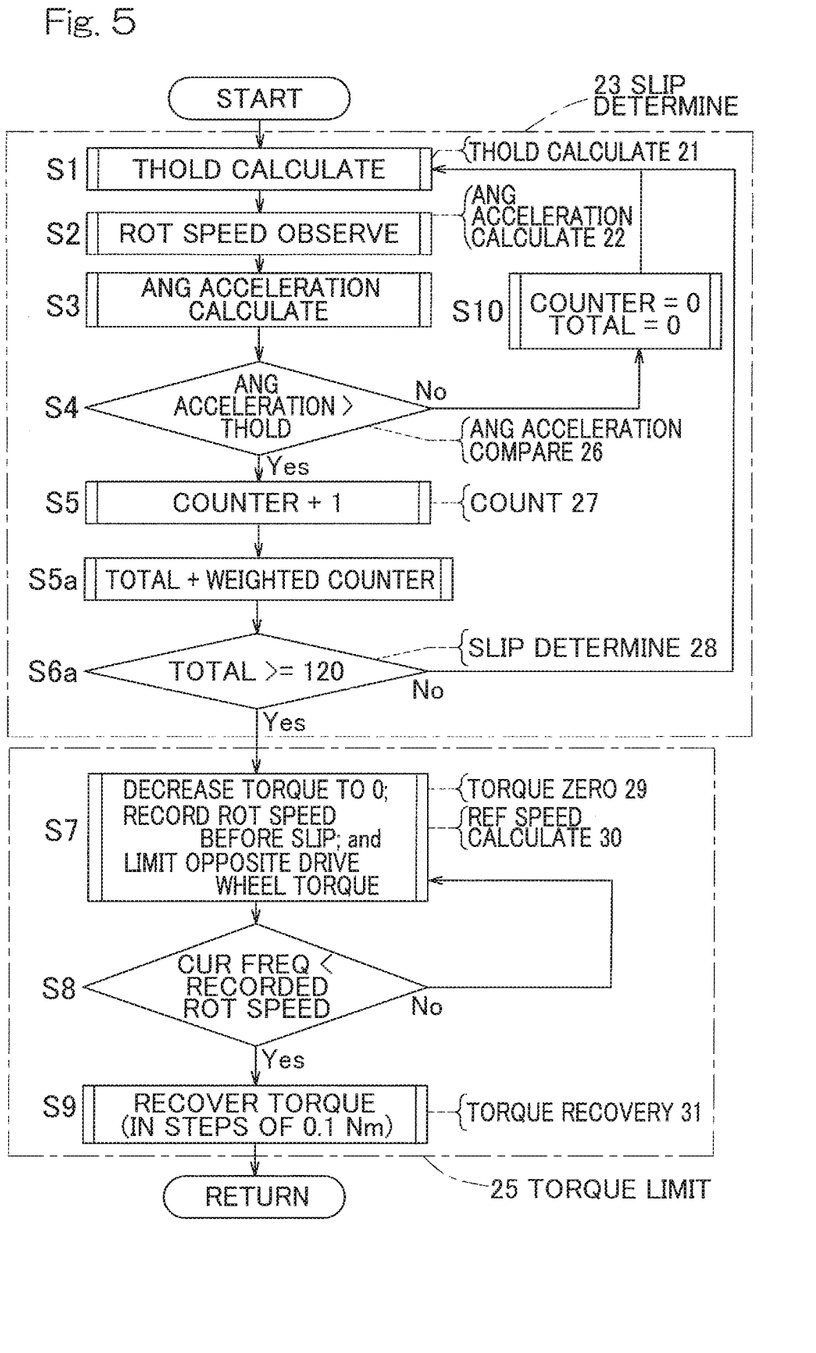
FIG. 5 is a flowchart showing a modification of the control operation of the slip control device shown in FIG. 1.

In particular, as shown in FIG. 5, a weighted value is added for each count (S5) by the counting section 27 (S5a). The weighted value may increase as the number of times increases, for example, the value is 1 for the first time and 2 for the second time. Instead, weighted value may decrease as the number of times increases, for example, the value is 5 for the first time and 3 for the second time. An appropriate weighted value may be determined through a test, simulation, or the like as appropriate. In a slip determination step (S6a), a total is compared to a set score, and if the total has reached the set score, it is determined that a slippage has occurred (S6a). If the total has not reached the set score, a return is made to step S1. In the case of this example, the slip determination on the basis of the total weighted count (S6a) is performed by the slip determination section 28. In the count value resetting step (S10), when the counter is reset to zero, the total is also reset to zero.

By performing appropriate weighting for each of the counts for the number of consecutive times, the slip determination can be performed further accurately.

The other configuration and effects in this embodiment are the same as in the first embodiment shown in FIGS. 1 to 4.

As a reference mode which is not included in the scope of the present invention, in step S6 or S6a of the slip determination in the above-described embodiment, even when the case where the angular acceleration exceeds the threshold does not necessarily occur consecutively at all times, for example, even when the case where the angular acceleration fails to exceed the threshold occurs once or twice while the case where the angular acceleration exceeds the threshold occurs consecutively, if the set number of times or the set score is exceeded, it may be determined that a slippage has occurred. In this case, for example, if the case where the angular acceleration fails to exceed the threshold occurs while the case where the angular acceleration exceeds the threshold occurs consecutively, a return is made to step S1 of threshold calculation without proceeding to step S10 of count value resetting. Alternatively, in step S6 or S6a of the slip determination, the set number of times or set score when the case where the angular acceleration exceeds the threshold occurs consecutively without interruption may be made different from that when the case where the angular acceleration exceeds the threshold is interrupted.

Figure 6:
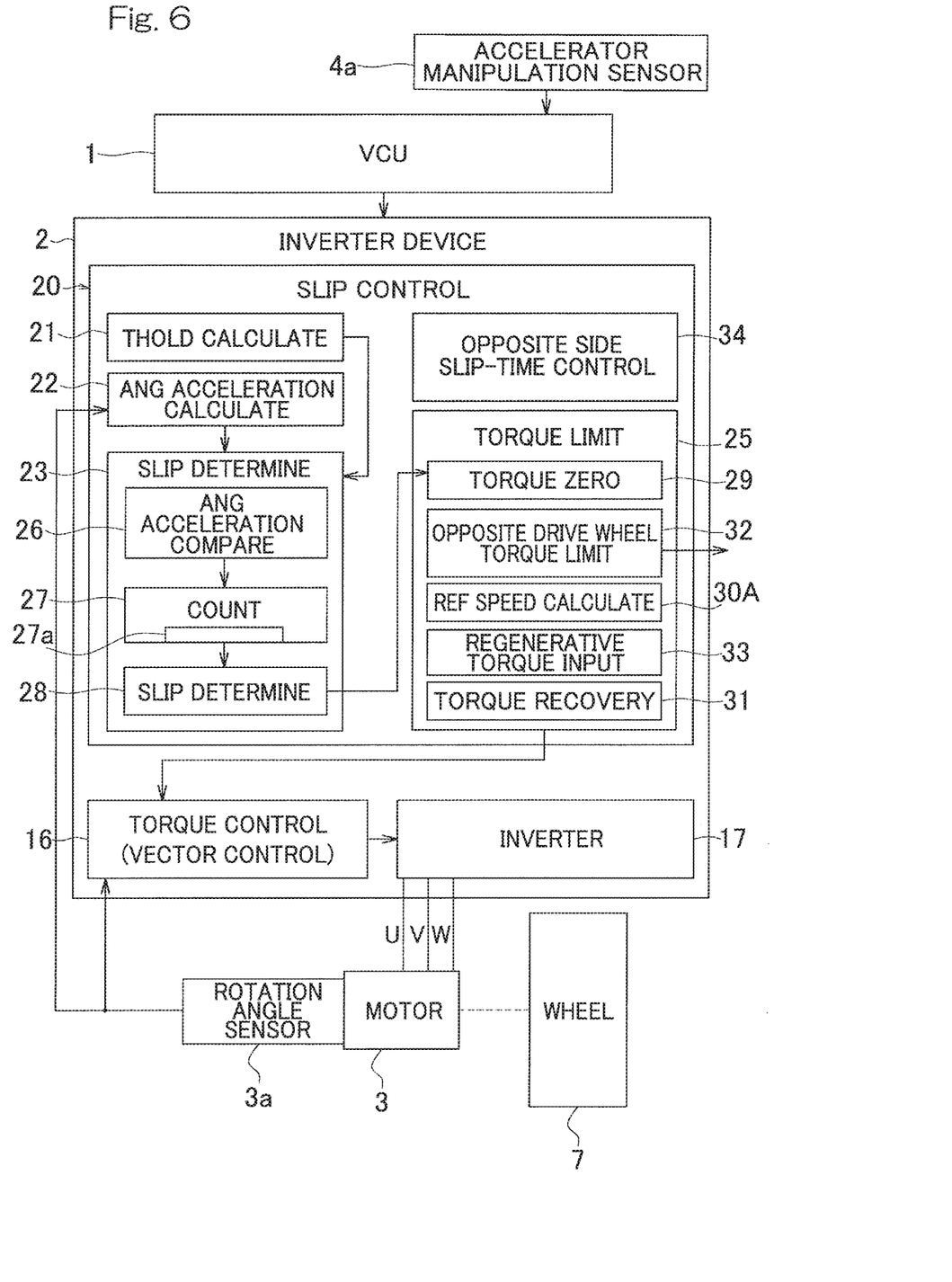
FIG. 6 is a block diagram of a schematic configuration of a slip control device, for an electric automobile, according to a second embodiment of the present invention.
Figure 7:
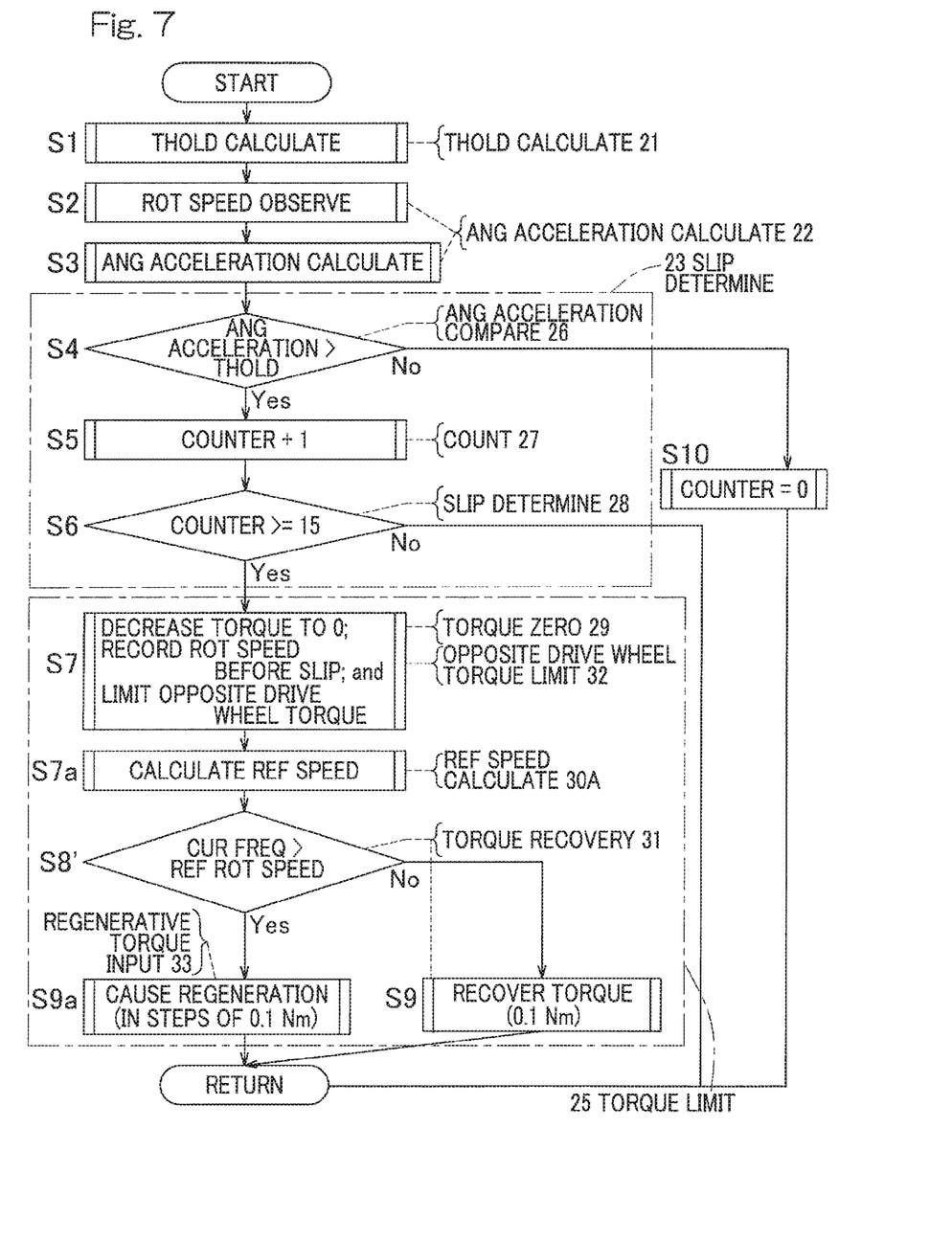
FIG. 7 is a flowchart showing a control operation of the slip control device shown in FIG. 6.

FIGS. 6 and 7 show a second embodiment of the present invention. This embodiment is an embodiment in which a regenerative torque input section 33 is further provided in the first embodiment shown in FIGS. 1 to 4. In addition, the process of a reference speed calculation section 30A is different from that in the first embodiment. The other elements are the same as in the first embodiment, except for elements described in particular. The functions of the regenerative torque input section 33 and the reference speed calculation section 30A will be described with reference to a flowchart in FIG. 7.

In this embodiment, as a result of comparison between the current rotation frequency and a reference rotation speed, if the current rotation frequency exceeds the reference rotation speed, that is, if the wheel 7 has not gripped yet, the motor unit 3 is caused to generate a regenerative torque (S9a). In this case, the regenerative torque is gradually increased, for example, is increased in steps of 0.1 Nm. After the step of generating the regenerative torque (S9a), a return is made to the start in the example in FIG. 7, but a return may be made to the step of comparison between the current rotation frequency and the reference rotation speed (S8') and the slip determination may be performed again. The process in the step of generating the regenerative torque (S9a) is performed by the regenerative torque input section 33.

As described above, if it is determined that a slippage has occurred, deceleration is positively made by causing the motor unit 3 to generate the regenerative torque, whereby the slippage can be eliminated more rapidly than when the motor torque is merely maintained at zero.

If it is determined in the step of comparison between the current rotation frequency and the reference rotation speed (S8') that the current rotation frequency is equal to or less than the reference rotation speed, that is, if the wheel 7 has gripped, the torque is gradually recovered (S9) similarly as in the above-described first embodiment.

The reference rotation speed in the step of comparison between the current rotation frequency and the reference rotation speed (S8') may be the same recorded rotation speed as in the first embodiment, but in this embodiment, a reference rotation speed is obtained through calculation by the reference rotation speed calculation section 30A as follows.

In this case, after the step of making the torque to be zero (S7), a reference rotation speed is obtained in a reference rotation speed calculation step (S7a).

The reference rotation speed is obtained as follows.

In the case that a single wheel has slipped, that is, when it is not determined that the drive wheel 7 laterally opposite to the drive wheel 7 determined as having slipped has slipped, the current rotation speed of the opposite drive wheel 7 is compared to the rotation speed at the time of angular acceleration comparison when the recorded count for the drive wheel determined as having slipped is 1, and the lower rotation speed is defined as a reference rotation speed.

In the case that both wheels have slipped, that is, when it is determined that the drive wheel 7 laterally opposite to the drive wheel 7 determined as having slipped has also slipped, the rotation speed at the time of angular acceleration comparison when the count by the counting section 27 corresponding to the drive wheel 7 determined earlier as having slipped is 1 is defined as a reference rotation speed. A combination of the module which performs the process in the reference rotation speed calculation step (S7a) and the module which performs the process of recording the rotation speed at the initial time of the consecutive N times in the predetermined storage area in step S7 is the reference speed calculation section 30A.

By calculating the reference rotation speed and comparing the reference rotation speed to the current rotation frequency as described above, more accurate slip determination can be performed.

Figure 8:
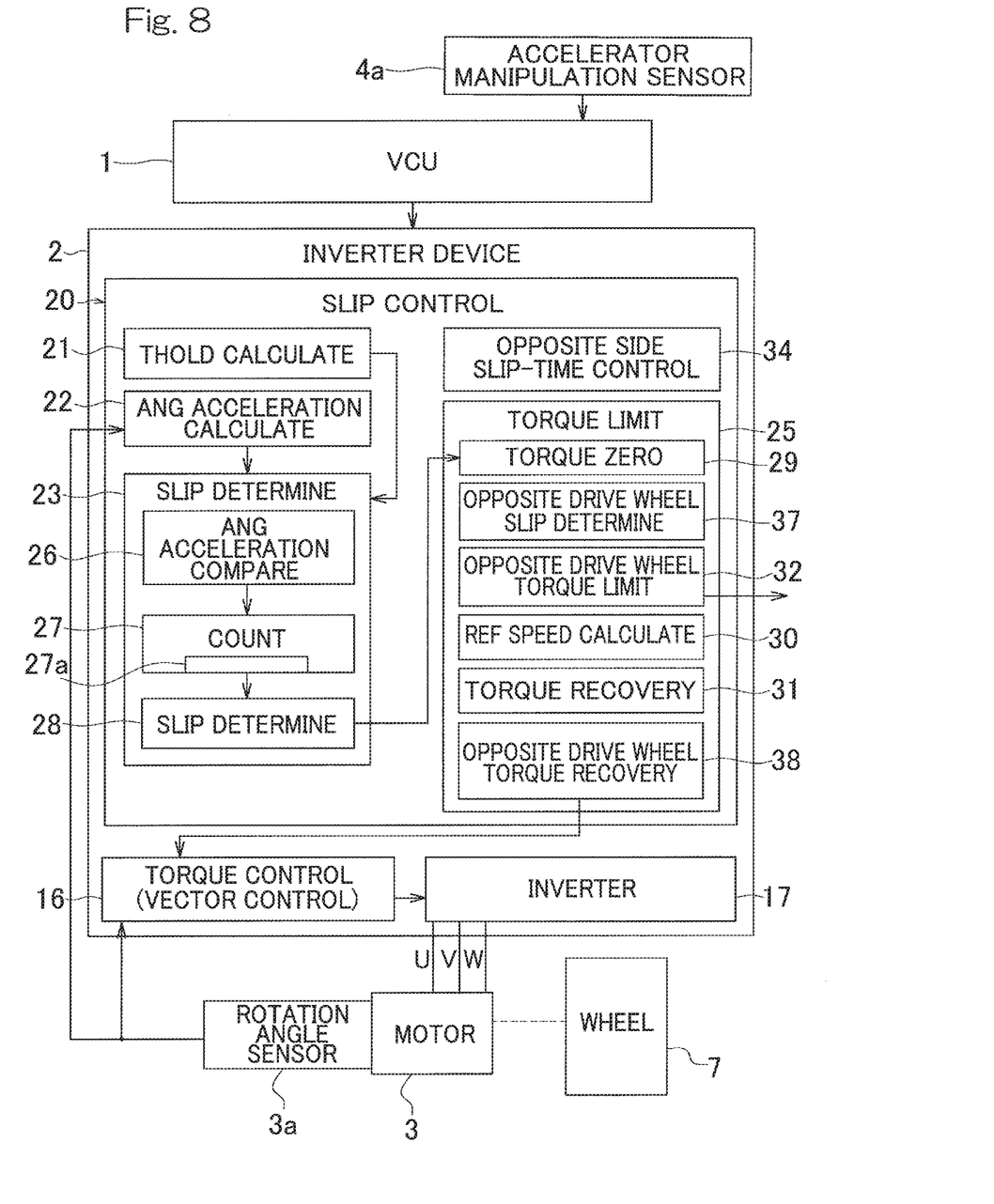
FIG. 8 is a block diagram of a schematic configuration of a slip control device, for an electric automobile, according to a third embodiment of the present invention.
Figure 9:
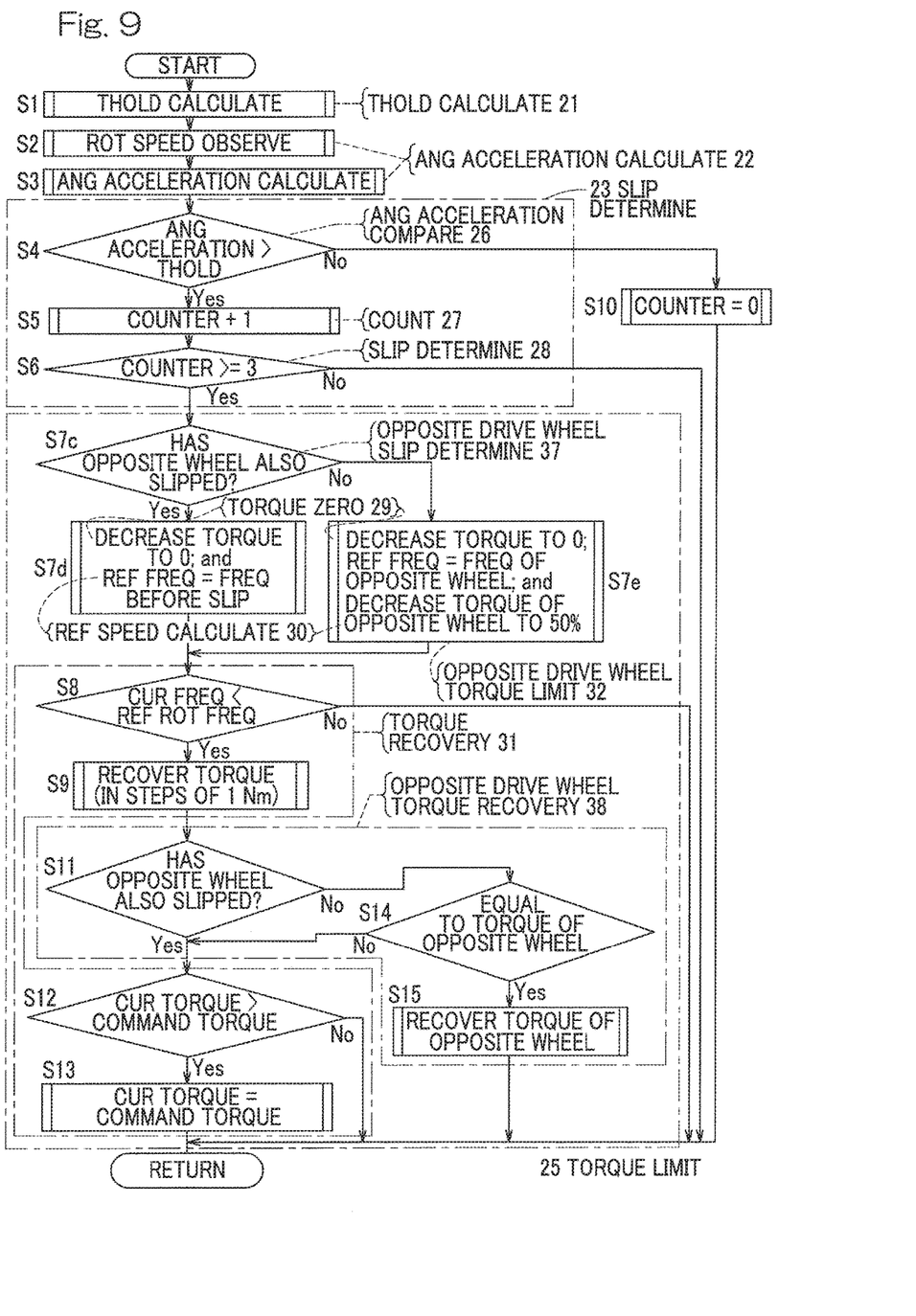
FIG. 9 is a flowchart showing a control operation of the slip control device shown in FIG. 8.

FIGS. 8 and 9 show a third embodiment of the present invention. This example is an example in which, in the first embodiment described with reference to FIGS. 1 to 4, addition and change are made as follows. The other elements are the same as in FIG. 1, except for elements described in particular.

In this embodiment, the torque limiting module 25 includes an opposite drive wheel slip determination section 37 which determines whether the drive wheel laterally opposite to the drive wheel determined as having slipped has slipped. In this slip determination, for example, in the case where the slip control device 20 is provided for each of the motors for the respective left and right drive wheels 7 as in FIG. 2, the result of slip determination by the slip control device 20 for the opposite drive wheel as in steps S5 or S6 described above may be used, or occurrence of a slippage may be determined by another method. Only if the opposite drive wheel slip determination section 37 determines that the laterally opposite drive wheel has not slipped, the opposite drive wheel torque limiting section 32 limits the torque developed by the motor unit 3 that drives the laterally opposite drive wheel. In this case, specifically, the opposite drive wheel torque limiting section 32 sends a torque limiting command to the inverter device 2 for the laterally opposite motor unit 3, and the inverter device 2 that has received the command performs torque limitation.

The torque limiting module 25 includes the following torque zeroing section 29, torque recovery section 31, and opposite drive wheel torque recovery section 38. If the slip determination module 23 determines that a slippage has occurred, the torque zeroing section 29 makes the torque developed by the motor unit 3, to be zero. The torque recovery section 31 determines whether the rotation speed of the motor unit 3 has decreased to a slip determination reference rotation speed based on the rotation speed before it is determined that the slippage has occurred. If the torque recovery section 31 determines that the rotation speed of the motor unit 3 has decreased to the reference rotation speed, the torque recovery section 31 gradually increases and recovers the torque developed by the motor unit 3. In the step of torque recovery by the torque recovery section 31, the opposite drive wheel torque recovery section 38 determines whether the opposite wheel has slipped. If the opposite drive wheel torque recovery section 38 determines that the opposite wheel has not slipped, when the torques of both of the left and right drive wheels become equal to each other, the opposite drive wheel torque recovery section 38 also increases the torque of the opposite drive wheel to recover the torque of the opposite drive wheel. The torque of each of the left and right drive wheels is determined, for example, from a detected current of the motor units 3 for the associated wheels.

In this embodiment, in a vehicle equipped with independent in-wheel motor drive devices for both wheels, when a slippage has occurred at a single wheel on a split μ road surface, the torque of the wheel that has slipped is made to be zero for the purpose of safety, and the torque of the wheel that has not slipped is also made to be, for example, 50% of the command value. Accordingly, the slippage of the wheel that has slipped is eliminated (the wheel has moved out from a low μ road surface), and the torque is recovered. Furthermore, when the torque of the wheel 7 that has slipped is recovered to be equal to the torque of the opposite wheel (the wheel that has not slipped), the torques of both wheels are recovered to the command torque at equal paces. Since control is performed as described above, the difference between the torques of both wheels may not be completely eliminated, but the effect of the in-wheel motor drive devices can be exerted, and an uncomfortable feeling to the driver can be alleviated to some extent.

In this embodiment, the following advantages are obtained. In the case where the slip control device 20 is provided for each of the motor units 3 for the left and right drive wheels, if the laterally opposite drive wheel has slipped, control is performed by the slip control device 20 for the opposite drive wheel. Thus, there is concern about interference of control by the slip control devices 20 for both wheels. Regarding this concern, as in this embodiment, only if the opposite drive wheel has not slipped, the opposite drive wheel torque limiting section 32 performs torque limitation, whereby interference of control by the slip control devices 20 for the left and right drive wheels is avoided. In addition, in this embodiment, when the torque of the laterally opposite drive wheel is made to be zero, after it is confirmed in the step of torque recovery by the torque recovery section 31 that the opposite drive wheel has not slipped, the torque of the opposite drive wheel is also recovered. Thus, the torques of both of the left and right drive wheels can be increased at equal paces, so that the straightness improves and operation feeling also improves.

Flow of the entire control in this embodiment will be described with reference to a flowchart in FIG. 9.

Threshold (Step S1)

An acceleration for the vehicle through the accelerator is calculated by the formulas 1 and 2 described above, and the angular acceleration dω/dt obtained by these formulas 1 and 2 is set as a threshold.

Observed Value (Step S2)

The rotation angle measured by the rotation angle sensor 3a of the motor unit 3 is differentiated twice to obtain an angular acceleration. Since the rotation angle is differentiated twice, the value is varied greatly and cannot be used for slip determination as it is. Thus, slip determination is performed by performing determination a plurality of consecutive times as described below.

Determination of Slip (Steps S4 to S6)

If the angular acceleration of the motor unit 3 becomes greater than the threshold, it should be determined that a slippage has occurred. However, since the value is varied greatly, if the number of consecutive times the angular acceleration exceeds the threshold becomes N times (N=3 in the example in FIG. 9), it is determined that a slippage has occurred. Thereafter, determination as to whether the opposite wheel (the laterally opposite drive wheel) has slipped is performed (S7c), and if the opposite wheel has not slipped (S7e), the rotation frequency of the opposite wheel is defined as a reference rotation frequency.

If the opposite wheel also has slipped (S7d), the value before the slippage, for example, the recorded rotation frequency when the count is 1, is defined as a reference rotation speed.

Decreasing Torque (Steps S7d and S7e)

If it is determined that a slippage has occurred, the torque is decreased to zero (S7d). If the opposite wheel has not slipped, the torque of the opposite wheel is decreased to 50% of the command torque (S7e).

Determination of Grip (Step S8)

If the current rotation frequency drops to the reference rotation speed, it is determined that a grip has occurred.

Torque Recovery (Steps S9 to S15)

If it is determined that a grip has occurred, the torque is gradually increased (in steps of 1 Nm) to be recovered (S9). The maximum value of the torque is defined by a torque command value from the accelerator. It is determined whether the opposite wheel has slipped (S11). If the opposite wheel has not slipped, the torques of both wheels are recovered at equal paces from the time when the torques of both wheels become equal to each other (S14, 15).

Before the torques of both wheels become equal to each other (S14), if it is determined in the opposite wheel slip determination step (S11) that the opposite wheel has slipped, it is determined whether the current torque has reached the torque command value from the accelerator (S12). If the current torque has reached the torque command value, a return is made directly, and if the current torque has not reached the torque command value, control is performed such that the current torque becomes equal to the torque command value from the accelerator (S13).

The slip control devices according to the embodiments are provided the vehicle including the in-wheel motor devices 11. In the in-wheel motor device 11, each wheel 7 is individually driven by the motor unit, and thus is greatly affected by a slippage. Therefore, the effect by the slip control with each slip control device according to the embodiments is more effectively exerted. Furthermore, in the vehicle including the in-wheel motor devices 11, a control system including the slip control devices, each of which is comprised of an in-wheel motor device 11 and an inverter device 2, and thus the VCU 1 does not need to be particularly changed or only needs to be slightly changed. Thus, it is easy to put the slip control devices into practical use.

The respective embodiments described above may be optionally combined with each other.

REFERENCE NUMERALS

3 . . . motor unit
5 . . . vehicle
7 . . . drive wheel
20 . . . slip control device
21 . . . threshold calculation module
22 . . . angular acceleration calculation module
23 . . . slip determination module
25 . . . torque limiting module
26 . . . angular acceleration comparison section
27 . . . counting section
28 . . . slip determination section
32 . . . opposite drive wheel torque limiting section

What is claimed is:

1. A slip control device, provided in an electric automobile including a plurality of electric motor units individually driving a plurality of associated drive wheels including left and right drive wheels, for slip-controlling the electric automobile, the slip control device comprising:
a threshold calculation module configured to calculate a normal angular acceleration of a first motor unit as a function of a manipulation amount of an accelerator to calculate a threshold for slip determination, on the basis of the calculated normal angular acceleration;
an angular acceleration calculation module configured to calculate an angular acceleration of the first motor unit on the basis of a detection value from a rotation speed detection device that detects a rotation speed of the first motor unit;
a slip determination module configured to determine whether a first drive wheel driven by the first motor unit has slipped, the slip determination module including:
an angular acceleration comparison section configured to compare the angular acceleration calculated by the angular acceleration calculation module to the threshold to determine whether the angular acceleration exceeds the threshold or is equal to or higher than the threshold;
a counting section configured to count a number of times the angular acceleration comparison section consecutively determines that the angular acceleration is equal to or higher than the threshold or exceeds the threshold; and
a slip determination section configured to determine that a slippage has occurred, if the number of times counted by the counting section has reached a set value; and
a torque limiting module configured to limit a torque developed by the first motor unit, if the slip determination module determines that the slippage has occurred, the torque limiting module including:
an opposite drive wheel torque limiting section configured to limit a torque developed by a second motor unit that drives a second drive wheel laterally opposite to the first drive wheel determined as having slipped, as well as the torque developed by the first motor unit.

2. The slip control device for the electric automobile as claimed in claim 1, wherein the rotation speed detection device includes a rotation angle sensor that measures a rotation angle of the associated motor unit, and differentiates the rotation angle measured by the rotation angle sensor, to detect the rotation speed.

3. The slip control device for the electric automobile as claimed in claim 1, wherein the torque limiting module includes a torque zeroing section configured to make the torque developed by the motor unit, to be zero if the slip determination module determines that the slippage has occurred.

4. The slip control device for the electric automobile as claimed in claim 3, further comprising a regenerative torque input section configured to cause the motor unit to generate a regenerative torque if a rotation speed of the drive wheel is higher than a determined reference rotation speed after the torque developed by the motor unit is made to be zero by the torque zeroing section.

5. The slip control device for the electric automobile as claimed in claim 3, wherein the torque limiting module includes a torque recovery section configured to: determine whether the rotation speed of the motor unit has decreased to a slip determination reference rotation speed based on a rotation speed before it is determined that the slippage has occurred; and gradually increase and recover the torque developed by the motor unit, if determining that the rotation speed of the motor unit has decreased to the slip determination reference rotation speed.

6. The slip control device for the electric automobile as claimed in claim 1, wherein the slip determination section adds, for each count, a weighted value depending on the count counted by the counting section, and determines that the slippage has occurred, if a total of weighted values has reached a set score.

7. The slip control device for the electric automobile as claimed in claim 1, wherein
the torque limiting module includes an opposite drive wheel slip determination section configured to determine whether the second drive wheel laterally opposite to the first drive wheel determined as having slipped has slipped, and
only if the opposite drive wheel slip determination section determines that the second drive wheel has not slipped, the opposite drive wheel torque limiting section limits the torque developed by the second motor unit that drives the second drive wheel.

8. The slip control device for the electric automobile as claimed in claim 5, wherein the torque limiting module includes:
an opposite drive wheel slip determination section configured to determine whether the second drive wheel laterally opposite to the first drive wheel determined as having slipped has slipped, and to limit the torque developed by the second motor unit that drives the second drive wheel, only if the opposite drive wheel slip determination section determines that the second drive wheel has not slipped; and an opposite drive wheel torque recovery section configured to determine whether the second drive wheel has slipped, in a step of the torque recovery by the torque recovery section, and to recover a torque of the second drive wheel as well as the torque of the first drive wheel when torques of both of the first and second drive wheels become equal to each other, if determining that the second wheel has not slipped.

9. The electric automobile comprising the slip control device as claimed in claim 1, wherein the slip determination module and the torque limiting module are provided for each of the motor units.

10. The electric automobile as claimed in claim 9, wherein each motor unit forms an in-wheel motor device.

* * * * *